(12) United States Patent
Justel et al.

(10) Patent No.: US 6,407,498 B1
(45) Date of Patent: Jun. 18, 2002

(54) LUMINESCENT MATERIAL COMPRISING AN ALKALINE EARTH BORATE

(75) Inventors: Thomas Justel; Hans Nikol, both of Aachen (DE); Cornelis W. A. Schetters, Geldrop (NL)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/437,477

(22) Filed: Nov. 10, 1999

(30) Foreign Application Priority Data

Nov. 18, 1998 (EP) .............................. 98203882

(51) Int. Cl.⁷ .............................. H01J 1/62; H01J 63/02
(52) U.S. Cl. ........................ 313/486; 313/485; 313/487; 252/301.4 P
(58) Field of Search ................................. 313/485, 486, 313/487; 252/301.4 P

(56) References Cited

U.S. PATENT DOCUMENTS

| | | | | |
|---|---|---|---|---|
| 4,602,188 A | * | 7/1986 | de Hair et al. | 313/487 |
| 4,764,301 A | | 8/1988 | Awazu et al. | 252/301.4 P |
| 4,800,319 A | * | 1/1989 | Van Kemenade et al. | 313/487 |
| 5,447,660 A | * | 9/1995 | Chau | 252/301.4 P |

* cited by examiner

*Primary Examiner*—Michael H. Day
*Assistant Examiner*—Glenn Zimmerman
(74) *Attorney, Agent, or Firm*—Dicran Halajian

(57) ABSTRACT

The invention discloses new luminescent materials for use as UV-A phosphors in suntanning lamps. The luminescent materials are of general formula $Ca_{3-x}B_2P_2O_{11+0.5x}:xCe^{3+}$ and $Ca_{2.5-x}B_{5.5}P_2O_{15.75+0.5x}:xCe^{3+}$.

5 Claims, No Drawings

LUMINESCENT MATERIAL COMPRISING AN ALKALINE EARTH BORATE

BACKGROUND OF THE INVENTION

The invention relates to a luminescent material, more in particular to a luminescent material that is suitable for use as a UV-A phosphor in suntanning lamps. The invention relates also to a discharge lamp.

An example of a luminescent material that is widely used as UV-A phosphor in suntanning lamps is barium silicate activated with lead (further indicated as BSP). This material combines a high quantum efficiency with a spectral power distribution which is suitable to obtain suntanning lamps with a UV-B content of about 1%. The main drawbacks are a low maintenance and sensitivity towards water. In order to overcome these disadvantages a phosphor particle coating can be applied. However, such a coating is normally applied making use of a wet chemical process and BSP is soluble to a certain extent even at relatively high pH-values. For this reason the coated material exhibits a lower light output than the starting material.

SUMMARY OF THE INVENTION

The invention aims to provide a luminescent material that is suitable for use as a UV-A phosphor in a suntanning lamp and has a low solubility in water.

A luminescent material in accordance with the invention includes an alkaline earth borate activated with trivalent cerium of a general formula belonging to the group formed by $Ca_{3-x}B_2P_2O_{11+0.5x}:xCe^{3+}$ and $Ca_{2.5-x}B_{5.5}P_2O_{15.75+0.5x}:xCe^{3+}$.

The luminescent materials according to the invention are stable in water, show a high quantum efficiency (>80%) and can easily be excited with radiation having a wavelength of 254 nm (the wavelength of most the UV radiation generated by mercury in a fluorescent lamp). The maximum of the emission band is situated between 360 and 365 nm. For these reasons the luminescent materials are very suitable to be used in the luminescent screen of a fluorescent suntanning lamp.

In case x divalent calcium ions are replaced by x monovalent ions chosen from the group formed by $Na^+$, $K^+$ and $Li^+$, the resulting luminescent material has no net electrical charge. It has been found that the presence of these monovalent ions improves the quantum efficiency and the absorption of a luminescent material according to the present invention.

Good results have been obtained for luminescent materials according to the invention, wherein $0.025 \leq x \leq 0.100$.

DETAILED DESCRIPTION OF THE PREFERRED EMBODIMENTS

The luminescent materials according to the invention were prepared by thoroughly grinding $CaCO_3$, $H_3BO_3$, $(NH_4)_2HPO_4$ and $CeO_2$ (and, if desirable, $Li_2CO_3$, $K_2CO_3$ and/or $Na_2CO_3$) in an agate mortar. The powder was subsequently heated in a reducing atmosphere containing $N_2$, $H_2$ and $H_2O$ in an alundum boat at 700 C for an hour. The resulting product was ground into a powder and heated at 1050 C in the same reducing atmosphere for an hour. The obtained material was ground and sieved (30 μm sieve).

For instance $Ca_{2.45}B_{5.5}P_2O_{15.775}:0.05Ce^{3+}$ was prepared using 24.523 gram (245 mmol) $CaCO_3$, 30.915 gram (550 mmol) $H_3BO_3$, 26.412 gram (200 mmol) $(NH_4)_2HPO_4$ and 0.861 gram (5.0 mmol) $CeO_2$ as starting materials. Similarly $Ca_{2.9}B_2P_2O_{11.05}:0.1Ce^{3+}$ was prepared using 29.027 gram (290 mmol) $CaCO_3$, 12.366 gram (200 mmol) $H_3BO_3$, 26.412 gram (200 mmol) $(NH_4)_2HPO_4$ and 1.721 gram (10 mmol) $CeO_2$ as starting materials.

Table I shows the properties of a number of luminescent materials of general formula $Ca_{3-x}B_2P_2O_{11+0.5x}:xCe^{3+}$ for different values of x. Similarly Table II shows the properties of a number of luminescent materials of general formula $Ca_{2.5-x}B_{5.5}P_2O_{15.75+0.5x}:xCe^{3+}$ for different values of x. In both tables $\lambda_{max}$ is the wavelength where the emission of the luminescent material is highest. FWHM is the full width at half maximum of the emission peak. QE is quantum efficiency and Abs is the absorption of 254 nm radiation of the luminescent material.

TABLE I

| x | $\lambda_{max}$(nm) | FWHM(nm) | QE(%) | Abs(%) |
|---|---|---|---|---|
| 0.025 | 360 | 58 | 84 | 62 |
| 0.050 | 362 | 57 | 91 | 74 |
| 0.075 | 363 | 57 | 91 | 79 |
| 0.100 | 363 | 56 | 90 | 86 |

TABLE II

| x | $\lambda_{max}$(nm) | FWHM(nm) | QE(%) | Abs(%) |
|---|---|---|---|---|
| 0.025 | 364 | 55 | 82 | 64 |
| 0.050 | 365 | 53 | 89 | 75 |
| 0.075 | 365 | 52 | 88 | 82 |
| 0.100 | 365 | 53 | 86 | 87 |

From these tables it can be concluded that both the quantum efficiency as well as the absorption of a luminescent material according to the invention are relatively high. The same optical properties that are listed in the tables were also measured for a luminescent material of formula $Ca_{2.4}B_{5.5}P_2O_{15.75}:0.05Ce^{3+};0.05Li^+$. This material is comparable with the material in the second row of table I, the difference being that in addition to trivalent cerium the material comprises an equimolar amount of monovalent lithium ions. The $\lambda_{max}$ of this material was 365 nm and its FWHM 53 nm. The emission peak of this material is thus very similar to the emission peak of the material in the second row of table II. However, the quantum efficiency and the absorption of the lithium containing material were 92% and 78% respectively and therefore higher than the quantum efficiency and the absorption of the material in the second row of table II.

What is claimed is:

1. Luminescent material comprising an alkaline earth borate activated with trivalent cerium and of a general formula consisting of at least one of $Ca_{3-x}B_2P_2O_{11+0.5x}:xCe^{3+}$ and $Ca_{2.5-x}B_{5.5}P_2O_{15.75+0.5x}:xCe^{3+}$.

2. Luminescent material according to claim 1, wherein x divalent calcium ions are replaced by y monovalent ions chosen from the group formed by $Na^+$, $K^+$ and $Li^+$.

3. Luminescent material according to claim 1, wherein $0.025 \leq x \leq 0.100$.

4. Discharge lamp equipped with a luminescent screen comprising a luminescent material comprising an alkaline earth borate activated with trivalent cerium and of a general formula consisting of at least one of $Ca_{3-x}B_2P_2O_{11+0.5x}:xCe^{3+}$ and $Ca_{2.5-x}B_{5.5}P_2O_{15.75+0.5x}:xCe^{3+}$.

5. Discharge lamp according to claim 4, wherein the discharge lamp is a fluorescent lamp.

* * * * *